INVENTOR.
VICTOR F. CARTWRIGHT
BY
Christie Parker & Hale
ATTORNEYS.

United States Patent Office 3,174,148
Patented Mar. 16, 1965

3,174,148
PROXIMITY MEASURING SYSTEM
Victor F. Cartwright, Fullerton, Calif., assignor to The Ralph M. Parsons Company, Los Angeles, Calif., a corporation of California
Filed July 25, 1961, Ser. No. 126,620
6 Claims. (Cl. 343—12)

This invention relates to a proximity measuring system, and more particularly, to a pulsed radio signal proximity detection system.

In the testing of new weapons and weapon systems, some means must be provided for determining if a missile comes within an acceptable distance of a target. It is generally not necessary that the missile actually hit the target, and, for evaluation purposes, it may be preferable that the missile not actually hit the target. While various schemes have been developed for determining the miss-distance between a missile and an intended target, they have not proved to be entirely satisfactory from the standpoint of ease of operation and installation, reliability, or cost.

The present invention presents a passive electronic scoring system which can be used in the evaluation of weapon systems. The scoring system of the present invention is designed to provide the ultimate in simplicity, accuracy, reliability and small physical size. Because of its small size, the equipment can be easily carried in a small target vehicle and because of its simplicity and low cost it is expendable in the event of a direct hit. Because it is a passive system, no equipment need be carried by the missile being tested.

In brief, the present invention is directed to apparatus for indicating the presence of a moving object within a predetermined distance of a target area. The apparatus is located at the target and includes an ultra high frequency transmitter. The transmitter is pulse modulated for generating periodic pulsed output signals in which the pulse duration time is equal to the transit time of the radio signal in transversing a distance equal to twice the desired proximity detection range. The transmitter is coupled to an omnidirectional antenna through a directional coupler which provides coupling from the antenna back to a detector. The directional coupler provides high attenuation to signals coupled directly from the transmitter to the detector. A low-pass filter is connected to the output of the detector which is arranged to block frequency components of the detector output corresponding to the carrier frequency and the pulse repetition frequency of the transmitter output. The output of the filter may be relayed to a remote station where means is provided for sensing and indicating the presence of an alternating signal output from the filter. The number of cycles in this alternating current output signal provides a quantitative basis for determining the minimum distance between the target and the missile, i.e., the miss-distance.

For a more complete understanding of the invention, reference should be made to the accompanying drawings, wherein.

Figure 1:
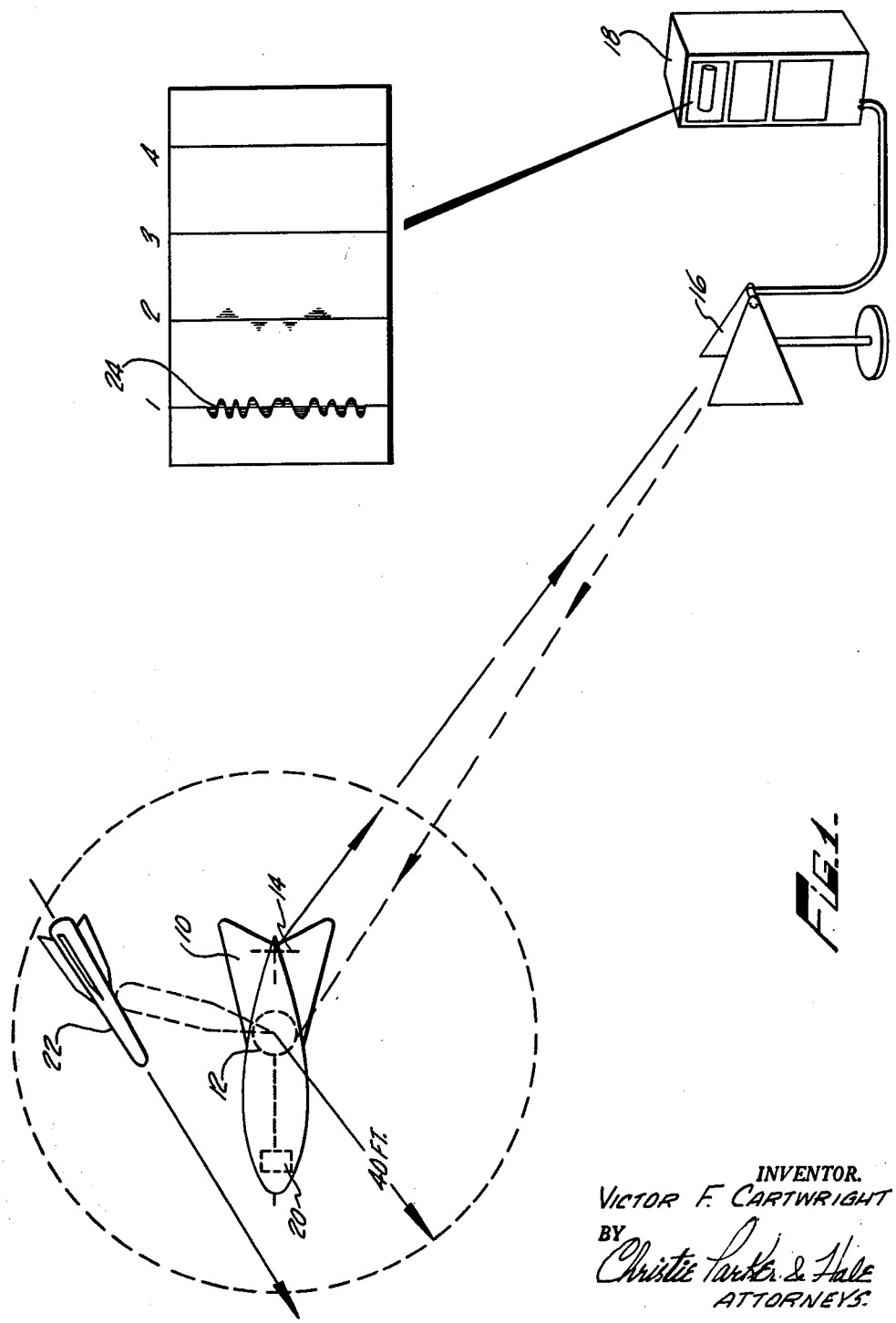
FIGURE 1 is a diagrammatic showing of the proximity scorer system of the present invention.

Referring to FIGURE 1, the numeral 10 indicates generally a target vehicle. The target is equipped with a scorer antenna 12 which is arranged to radiate ultra high frequency signals in all directions. The target is also equipped with a telemetering antenna 14 for transmitting telemetering data to a ground receiving antenna 16 and a telemetering ground station 18. The proximity scoring circuit, indicated generally at 20, is carried in the target vehicle and is coupled to the scorer antenna 12 and the telemetering antenna 14 in a manner hereinafter described.

When a missile, such as indicated at 22, passes within scoring range, such as indicated by the dotted circle having a radius of forty feet from the scorer antenna, a signal is generated which is transmitted to the ground station over the telemetering link. The ground station reproduces a visual record by means of an oscillograph or suitable indicating means, a typical record being indicated at 24. The number of cycles in the reproduced signal at the ground station provides a measure of the closest distance within the forty foot radius at which the missile 22 passed the target 10.

The ground station is also arranged to transmit a test signal from the antenna 16 to the scorer antenna 12 which sets up a test operation to determine if the proximity scorer circuit in the target is operating correctly.

Figure 2:
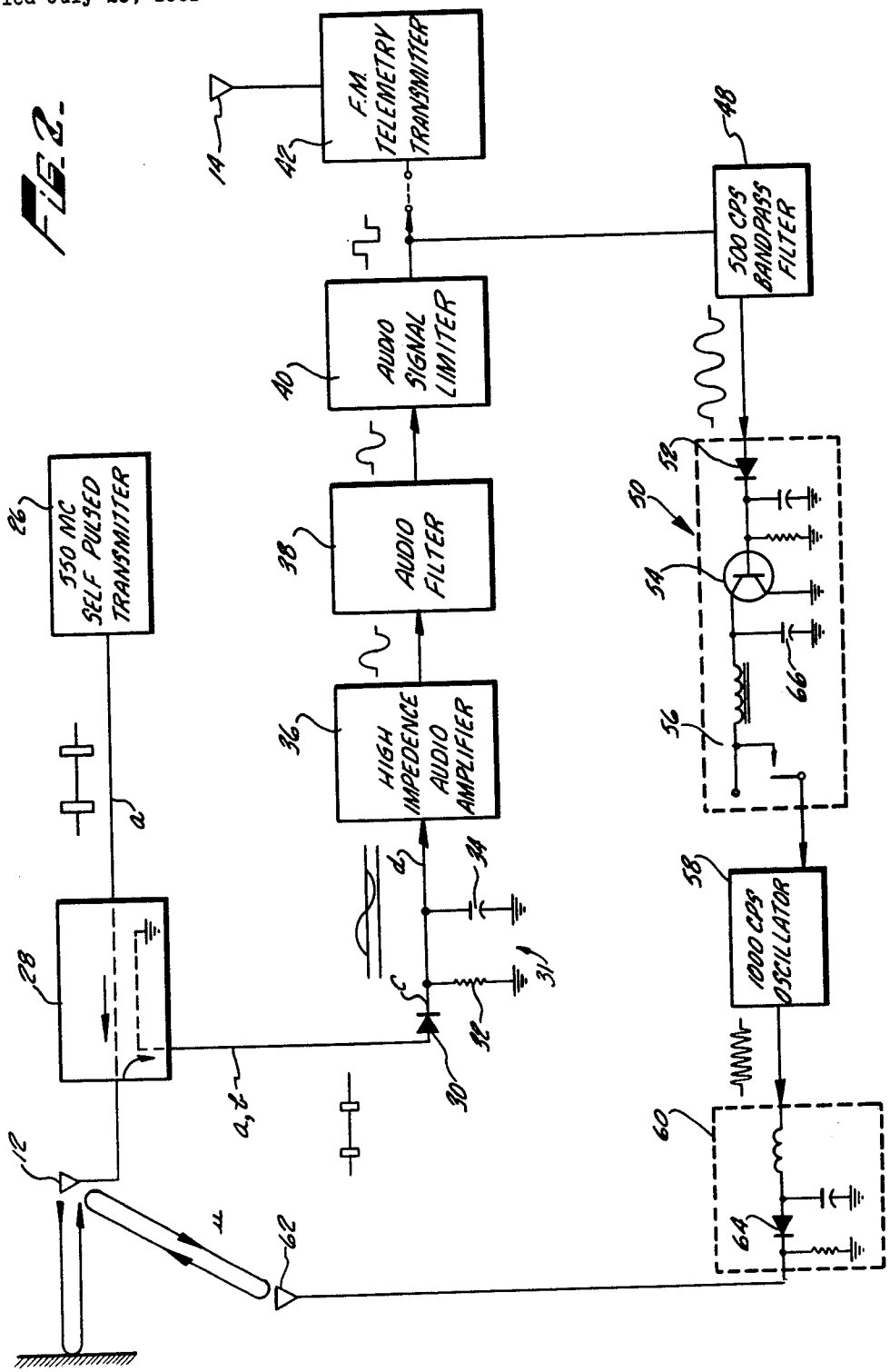
FIGURE 2 is a block diagram of the essential components of the system.

Referring to FIGURE 2, a block diagram of the proximity scorer circuit carried in the target is shown in more detail. The circuit includes a self-pulsed ultra high frequency transmitter 26 preferably generating a carrier signal of the order of 550 megacycles. The output of the transmitter is pulse modulated preferably at a 350 kc. pulse repetition rate. Effective operation of the circuit requires accurately controlled pulse duration time, for example, of the order of .08 microseconds. The pulse duration time corresponds to the time required for a radio signal to traverse the distance from the scorer antenna out to the forty foot maximum range and back to the antenna. Because of the short duration of the pulse, it is desirable to have the transmitter pulse envelope rise and decay in a very short interval of time in order that the scoring radii can be determined accurately.

The output of the transmitter 26 is coupled to the scorer antenna 12 through a conventional RF directional coupler 28. The directional coupler 28 is arranged to introduce only a very small insertion loss between the transmitter 26 and the antenna 12. The secondary output of the directional coupler 28 is connected to a detector diode 30. The directional coupler 28 provides very poor coupling between energy passing from the transmitter 26 to the antenna 12 and the detector 30, e.g., −30 db coupling, whereas the direction coupler 28 provides fairly high coupling of energy from the antenna 12 to the detector 30, e.g., −3 db.

The output of the detector 30 is filtered by a low-pass filter 31 such as provided by the parallel resistor 32 and capacitor 34. The values of the resistor and capacitor are chosen such that the filter cuts off frequency components in the output of the detector corresponding to the pulse repetition rate or the ultra high frequency of the transmitter carrier. The output of the filter is coupled to a high impedance audio amplifier 36 and passed through an audio filter 38 to an audio signal limiter 40. The output of the signal limiter is coupled to a conventional FM telemetering transmitter 42.

Figure 3:
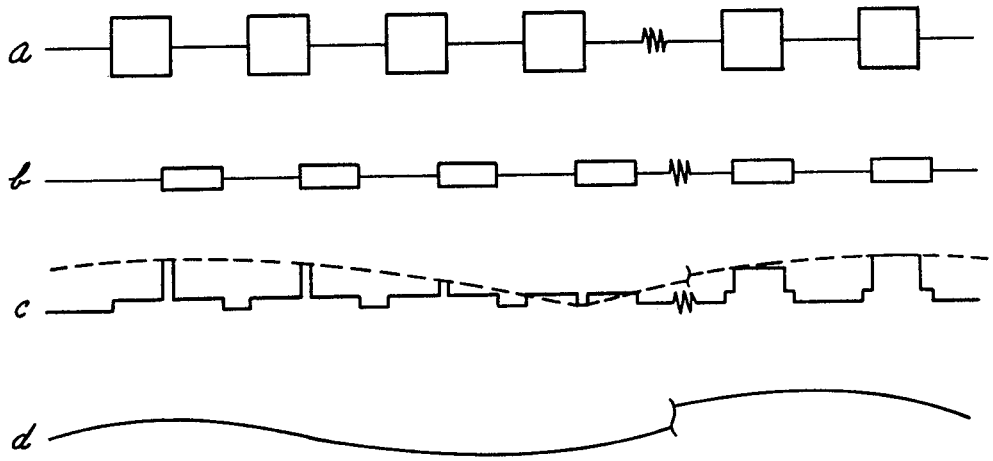
FIGURE 3 is a group of wave forms useful in explaining the operation of the system.

In operation, the output of the transmitter 26 is applied to the antenna 12 through the directional coupler and transmitted into the space around the target. See FIGURE 3a. A portion of the energy is reflected by the missile 22 back to the scorer antenna 12 and applied to the detector 30. See FIGURE 3b. If the missile is outside the forty foot range, the reflected signal will be received after the entire pulse of energy from the transmitter has been radiated.

The energy coupled directly from the transmitter 26 to the detector 30 through the directional coupler 28 produces a series of low level pulses at the pulse repetition frequency, these pulses being rejected by the low-pass filter 31. Likewise, any signals reflected from a reflecting object beyond the range of forty feet of the antenna 12 produce a series of similar pulses at the output of the detector 30 which are rejected by the low-pass filter. However, if a reflected object is within forty feet of the antenna 12, there is a time overlap between the transmitted pulse and the reflected pulse as applied to the detector 30. During the time of pulse overlap between the transmitted and reflected pulses as applied to the detector 30, the phase relation between the ultra high frequency energy of the transmitted and reflected pulses is determined by the distance between the antenna and the reflecting object as measured in half wavelengths at the ultra high frequency. If the two signals are in phase, they will reinforce each other, resulting in large amplitude pulses being produced at the output of the detector 30. If they are 180° out of phase, they will cancel each other and the amplitude of the signal at the output of the detector will go to zero. Thus as the reflecting object such as a missile, moves towards the antenna 12 within the forty foot radius, a series of pulses are produced at the output of the detector 30. See FIGURE 3c. This change in amplitude of the pulses goes through a complete cycle as the target moves through a half wavelength. The fundamental frequency of this pulse amplitude modulated signal is passed by the low-pass filter. See FIGURE 3d. The frequency of course is dependent on the velocity of the reflecting object relative to the antenna 12. Thus the frequency $F_0$ of the fundamental component of the pulse amplitude modulated signal may be expressed as follows:

$$F_0 = \frac{2v}{\lambda}$$

where $\lambda$ is the wavelength of the carrier frequency and $v$ is the relative velocity between the antenna and the reflector in consistent units.

In summary then, if the reflecting object is outside the forty foot radius in which the space delay is greater than the pulse width, the reflected signal returns to the antenna at a time after the transmitter has ceased transmitting. Therefore, at distances greater than the space delay corresponding to the pulse width, no voltage is produced at the output of the detector 30 and the filter 31. When the missile comes within the maximum range determined by the pulse width, an A.C. signal is produced at the output of the low-pass filter which is amplified, filtered, limited and transmitted to the ground recording station by the telemetering link. At the ground recording station, this A.C. signal is reproduced on an oscillograph or other suitable recording equipment. In this manner, an indication of a "hit" is recorded in the ground recording station if a missile passes the transmitting antenna within the distance specified by the pulse width. If the missile passes outside this specified distance, no signal is recorded regardless of missile size or velocity.

Figure 4:
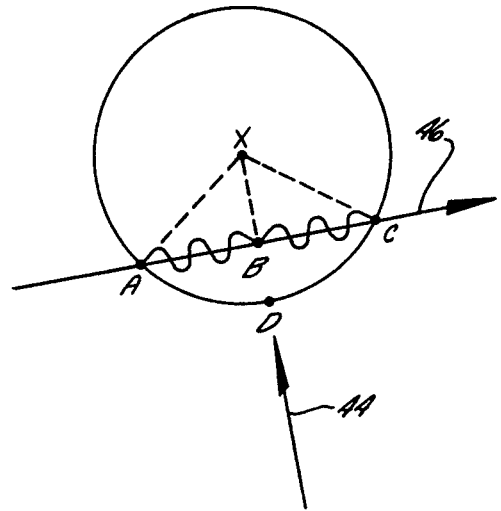
FIGURE 4 is a diagram used in explaining the quantitative range information obtained by the invention.

Not only does the record at the ground station show whether a "hit" has been scored, but it also provides quantitative information as to the minimum distance at which the missile approached the target. This can be shown by reference to the diagram of FIGURE 4. Consider the target as located at point X and the circle as indicating the maximum range at which a "hit" is scored. Now consider a missile directed along a collision course as indicated by the arrow 44 so that it passes along the radius formed by the line DBX. Traversing the distance D to X, the missile will pass through a distance equal to a predetermined number of half wavelengths at the carrier frequency. At 550 megacycles, a wavelength is approximately two feet so that a total of forty cycles would be generaed at the output of the filter as the missile traversed the forty foot radiuss to the center location of the target.

A near miss can also be quantitatively evaluated by this method. Again referring to FIGURE 4, consider a missile which traverses the path indicated by the arrow 46. As the missile passes from point A to point B, it traverses a radial distance corresponding to the distance B-D. The number of cycles generated passing from point A to point B is the same as if the missile had passed from point D to point B. Thus the miss-distance in feet, namely, the distance D—X, is equal to forty minus the number of cycles generated as the missile proceeds from point A to point B. Of course, the missile generates the same number of cycles in passing from point B to point C but the two groups of cycles can be easily distinguished on the recorded wave form since a discontinuity exists where the component of velocity changes from that of approaching the target to that of going away from the target.

Since a miss results in no signal at the ground station, it is normally impossible to distinguish malfunction of the system from an actual target miss. Therefore, a special calibration arrangement is provided at the target station for testing the proper operation of the scoring circuit. To this end, the output of the audio signal limiter 40 at the target is coupled to a 500 cycle per second band-pass filter 48. The output of the band-pass filter is coupled to a relay circuit indicated generally at 50. The relay circuit includes a diode rectifier 52, the output of which is filtered and applied to a single stage transistor amplifier 54 for driving a coil of a relay 56.

The relay 56 is arranged to close a circuit for turning on a 1000 cycle per second oscillator 58 causing it to start oscillating. The output of the oscillator 58 feeds directly into a diode modulator circuit 60 which is coupled to a parasitically excited calibration antenna 62. Because the diode 64 of the diode modulator circuit 60 is coupled across the calibration antenna input, a variation of current through the diode caused by the applied 1000 cycle per second signal, causes the impedance of the calibration antenna to change similarly. The changing impedance of the calibration antenna results in a changing phase of the reflected signals between the antenna 12 and the calibration antenna 62. As a result, the 1000 cycle per second signal is reproduced at the output of the low-pass filter 31 and is relayed back to the ground station. Thus by transmitting a 550 megacycle carrier from the ground station to the target modulated with a 500 cycle per second signal, the relays 56 can be closed if the target circuit is in proper operating condition, a 1000 cycle per second signal will be transmitted back to the ground station over the telemetering link. When the command signal from the ground station stops a capacitor 66 in the relay circuit 50 holds the relay 56 closed for a predetermined time permitting the 1000 cycle per second signal to pass through the airborne system and be retransmitted to the ground station.

What is claimed is:

1. Apparatus for indicating the proximity of a missile within a predetermined radial distance of a target comprising an omnidirectional antenna, a transmitter, means for periodically pulsing on the transmitter output for a period corresponding to twice the time it takes a radio signal to traverse a distance equal to twice the predetermined radial distance, a detector, means for connecting the transmitter to the antenna and the antenna to the detector, said means providing high rejection of signals between the transmitter and the detector and low rejection of signals between the antenna and the detector, and means for recording the number of cycles in the signal generated at the output of the detector as the missile passes within scoring range of the target.

2. Apparatus for indicating the presence of a moving object within a predetermined radial distance of a target area comprising a transmitter, means for periodically pulsing the output from the transmitter, the pulse duration time being equal to the transit time of a radio signal in traversing said predetermined radial distance, twice, an antenna located at the center of the target area, a detector, means for connecting the output signal of the transmitter to the antenna and coupling signals received by the antenna to the detector, said means providing high attenuation coupling between the output signal of the transmitter and the detector, a low-pass filter coupled to the output of the detector, the low-pass filter blocking frequency components of the detector output corresponding to the carrier frequency and the pulse repetition frequency of the transmitter output, and means for sensing and indicating the presence of a low frequency alternating current signal output from the filter.

3. Apparatus as defined in claim 2 further including a parasitic antenna in proximity to the omnidirectional antenna, means responsive to a test signal of predetermined frequency at the output of the filter for initiating an audio signal, and a detector for coupling the audio signal to the parasitic antenna for varying the antenna impedance of the parasitic antenna at the audio rate, whereby the audio frequency is reproduced at the output of the low-pass filter.

4. Apparatus for measuring the proximity range of a missile within a predetermined radial distance of a target comprising an omnidirectional antenna, a transmitter, means for periodically pulsing on the transmitter output for a period which is longer than the time required for the transmitted pulse to tranverse said predetermined distance, a detector, means for coupling the transmitter and the detector to the antenna, said means providing high rejection of signals between the transmitter and the detector and low rejection of signals between the antenna and the detector, and means for recording the number of cycles in the signal generated at the output of the detector as the missile passes within scoring range of the target.

5. Apparatus for measuring the proximity range of two relatively moving objects within a predetermined radial distance of each other comprising at one of the objects an antenna, a transmitter, means for periodically pulsing on the transmitter output for a period which is longer than the time required for the transmitted pulse to traverse said predetermined distance, a detector, means for coupling the transmitter and the detector to the antenna, said coupling means providing high rejection of signals between the transmitter and the detector and low rejection of signals between the antenna and the detector, and means for recording the number of cycles in the signal generated at the output of the detector as the two objects pass within range of each other.

6. Apparatus for indicating the distance between two relatively moving objects which pass within a predetermined distance, said apparatus comprising:
 a transmitter at one of the objects for transmitting radiant energy; means periodically pulsing the radial energy for pulse duration periods corresponding to twice the time it takes a radio signal to traverse said predetermined distance;
 a receiver at said one of the objects for receiving pulsed radiant energy reflected from the other object, the receiver including means for mixing the reflected energy and a portion of the transmitted energy;
 a low pass filter coupled to the output of the mixing means for passing only signal components having frequencies below the pulse repetition frequency of the pulsed transmitter;
 and means for indicating the number of cycles of a low frequency alternating current signal output from the filter.

References Cited in the file of this patent
UNITED STATES PATENTS

| | | |
|---|---|---|
| 2,600,255 | McConnell | June 10, 1952 |
| 2,992,422 | Hayes | July 11, 1961 |
| 3,014,215 | MacDonald | Dec. 19, 1961 |
| 3,029,426 | Robinson | Apr. 10, 1962 |